(12) United States Patent
Gehr

(10) Patent No.: US 6,241,273 B1
(45) Date of Patent: Jun. 5, 2001

(54) COLLAPSIBLE STROLLER WITH SLIDABLE BASKET

(75) Inventor: Glenn E. Gehr, East Earl, PA (US)

(73) Assignee: Graco Children's Products Inc., Elverson, PA (US)

( * ) Notice: Subject to any disclaimer, the term of this patent is extended or adjusted under 35 U.S.C. 154(b) by 0 days.

(21) Appl. No.: 08/907,487

(22) Filed: Aug. 8, 1997

(51) Int. Cl.[7] ....................................................... B62B 9/12
(52) U.S. Cl. .......................... 280/642; 224/409; 280/650; 280/658
(58) Field of Search ................................ 280/639, 38, 641, 280/642, 644, 647, 650, 657, 658, 47.34, 47.35, 47.38, 47.41; 224/275, 409, 497; 297/188.02, 188.11

(56) References Cited

U.S. PATENT DOCUMENTS

| | | | |
|---|---|---|---|
| 1,875,107 | * 8/1932 | Mueller ............................... 224/409 |
| 3,561,787 | * 2/1971 | Toda et al. ........................... 280/642 |
| 4,061,395 | * 12/1977 | Boole .............................. 297/188.11 |
| 4,317,581 | 3/1982 | Kassai .................................. 280/644 |
| 4,817,982 | 4/1989 | Kassai .................................. 280/644 |
| 4,828,278 | 5/1989 | Nakao et al. ......................... 280/644 |
| 4,923,208 | * 5/1990 | Takahashi et al. .................... 280/642 |
| 4,930,697 | 6/1990 | Takahashi et al. .................... 224/275 |
| 4,953,887 | 9/1990 | Takahashi et al. .................... 280/647 |
| 5,454,584 | 10/1995 | Haut et al. ........................... 280/642 |
| 5,611,560 | * 3/1997 | Thimmig ............................. 280/642 |
| 5,741,021 | * 4/1998 | Saint et al. ......................... 280/47.38 |

* cited by examiner

Primary Examiner—Michael Mar
(74) Attorney, Agent, or Firm—Foley & Lardner

(57) ABSTRACT

A collapsible stroller with a slidable basket is provided. In the fully opened position, the basket extends to the rear of the stroller to allow easy access, and a relatively large storage space. During folding, the basket is retracted toward the front of the stroller to minimize storage space.

18 Claims, 11 Drawing Sheets

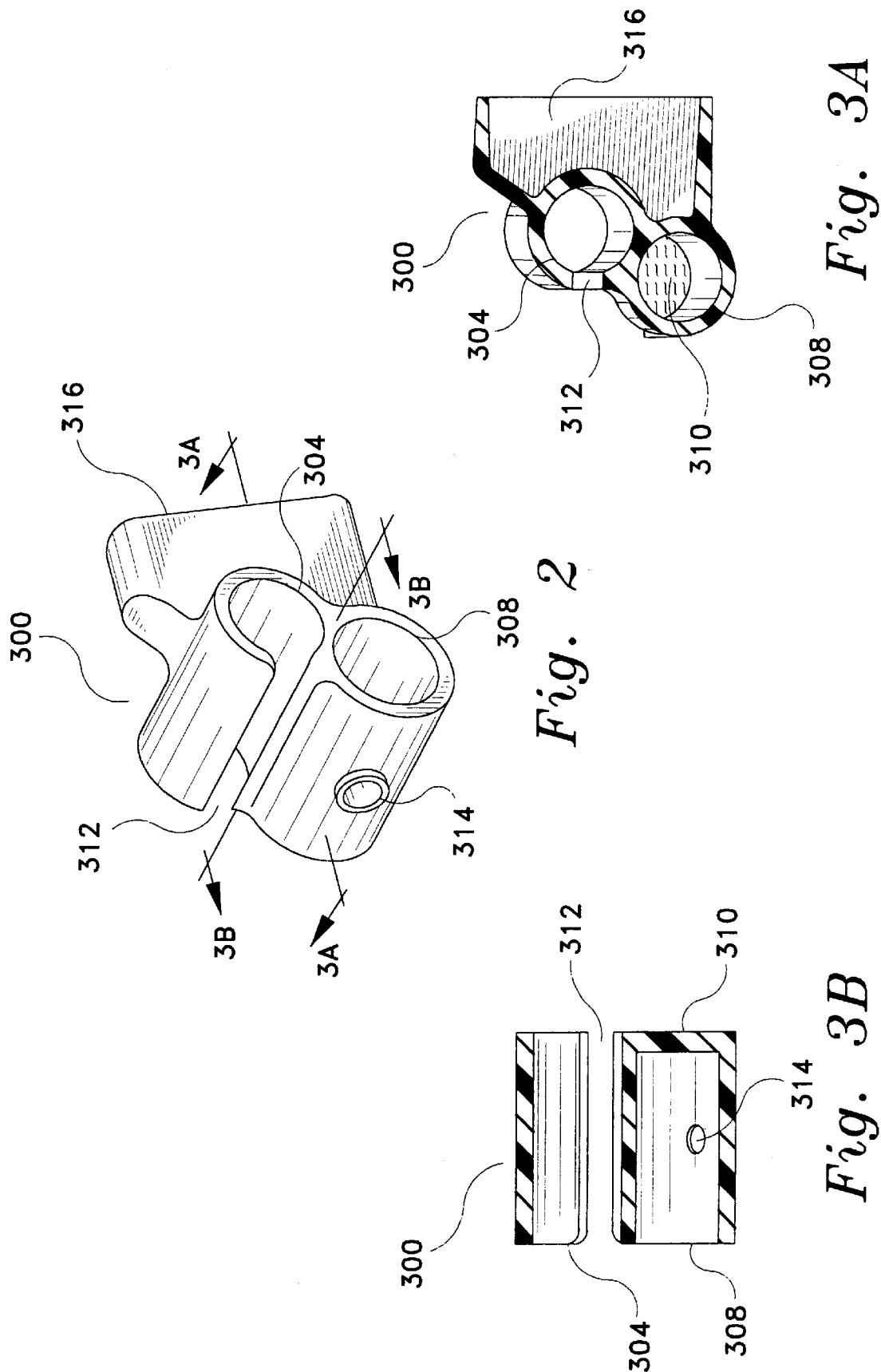

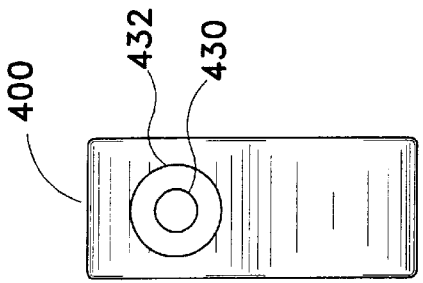
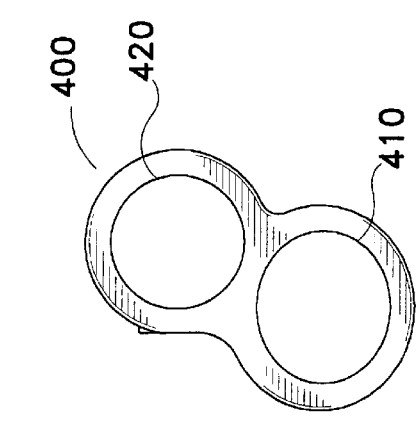
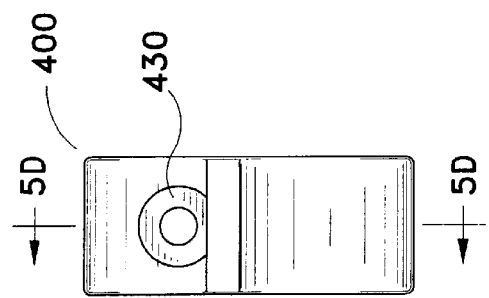
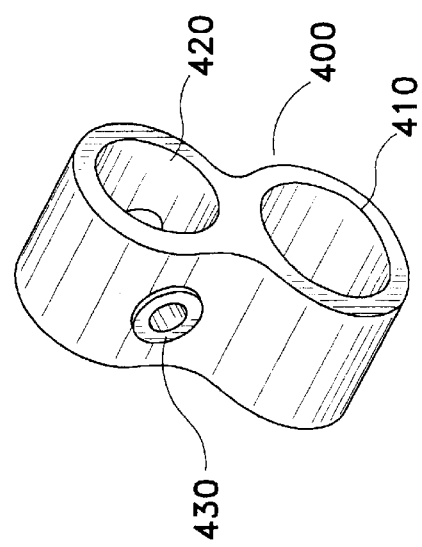
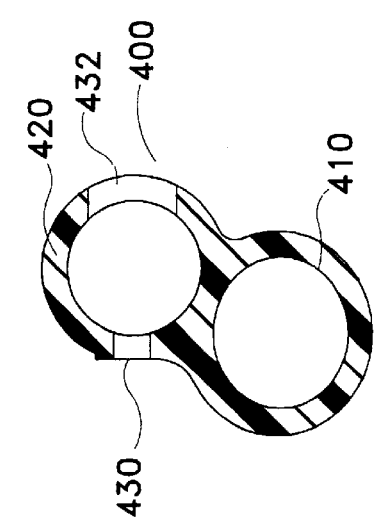

COLLAPSIBLE STROLLER WITH SLIDABLE BASKET

This application claims the benefit of Application No. 29719724.2 (29702252.0) filed in Germany on Feb. 10, 1997, which is hereby incorporated by reference.

BACKGROUND OF THE INVENTION

1. Field of the Invention

The present invention is directed to a collapsible stroller with a slidable basket member, and more particularly to such a basket member which is extended when the stroller is open to allow easy access to the basket in the deployed configuration and which retracts during the folding of the stroller to reduce the storage space necessary for the stroller in the folded configuration.

2. Discussion of the Related Art

Conventional strollers may include a basket for storing items located underneath the child seat. The basket may be used for storing various child care items such as food, bottles, or clothes, as well as other items such as purses, handbags, or the like, and items purchased during shopping. Such baskets increase the convenience of conventional strollers. Conventional strollers also may be collapsible and folded from an open, deployed position for normal use, to a folded or closed position for convenient storage or transport. One conventional solution provides for collapsible stroller in combination with a basket which allows easy access to the basket while not substantially increasing the amount of space occupied when the stroller is folded. See U.S. Pat. No. 5,454,584 to Haut et al., issued on Oct. 3, 1995.

However, in certain frame configurations of conventional strollers, it has been difficult to provide a stroller which collapses to a relatively small space while providing a relatively large, easily accessible, and properly functioning basket. This problem is particularly prevalent in stroller frame configurations based upon a parallelogram structure. For example, dual or tandem child strollers (in a one child behind the other configuration) have typically not provided a convenient and relatively large fully functional basket in combination with folding into a relatively small space.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 is an isometric view of a preferred basket connecter in accordance with the present invention;

FIG. 3A is a cross-sectional view of a preferred basket connecter in accordance with the present invention taken along line 3A—3A of FIG. 2;

FIG. 3B is a cross-sectional view of a preferred basket connecter in accordance with the present invention taken along line 3B—3B of FIG. 2;

FIG. 4 is an isometric view of a preferred basket guide in accordance with the present invention;

FIG. 5A is a side view of a preferred basket guide in accordance with the present invention from a point of view outside the frame of the stroller;

FIG. 5B is an end view of a preferred basket guide in accordance with the present invention from a point of view at the rear of the stroller;

FIG. 5C is a side view of a preferred basket guide in accordance with the present invention from a point of view within the frame of the stroller;

FIG. 5D is a cross-sectional view of a preferred basket guide in accordance with the present invention taken along line 5D—5D of FIG. 5C;

SUMMARY OF THE INVENTION

Accordingly, it is an object of the present invention to provide a collapsible stroller with an easily accessible and relatively large basket which collapses into a relatively small space.

It is another object of the present invention to provide a collapsible stroller which includes an extending basket in the fully opened position, and which retracts during the folding operation underneath the frame of the stroller to a relatively small configuration.

It is yet another object of the present invention to provide a collapsible stroller with a slidable connection between the basket and the frame.

It is still another object of the present invention to provide a collapsible stroller with a frame, a basket member extending toward the rear of the frame, and a basket connector fixedly connected to the basket member and slidably connected to the frame.

To achieve these and other advantages and in accordance with the purpose of the present invention, as embodied and broadly described, the collapsible stroller includes a frame having a front and rear, a basket member extending toward the rear of the frame, and a basket connector fixedly connected to the basket member and slidably connected to the frame. In another aspect, the collapsible stroller includes a frame having a front and rear, and a basket member extending toward the rear of the frame wherein during folding of the frame, the basket member slides toward the front of the frame.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION OF THE PREFERRED EMBODIMENTS

Reference will now be made in detail to the preferred embodiments of the present invention, examples of which are illustrated in the accompanying drawings.

Figure 1:
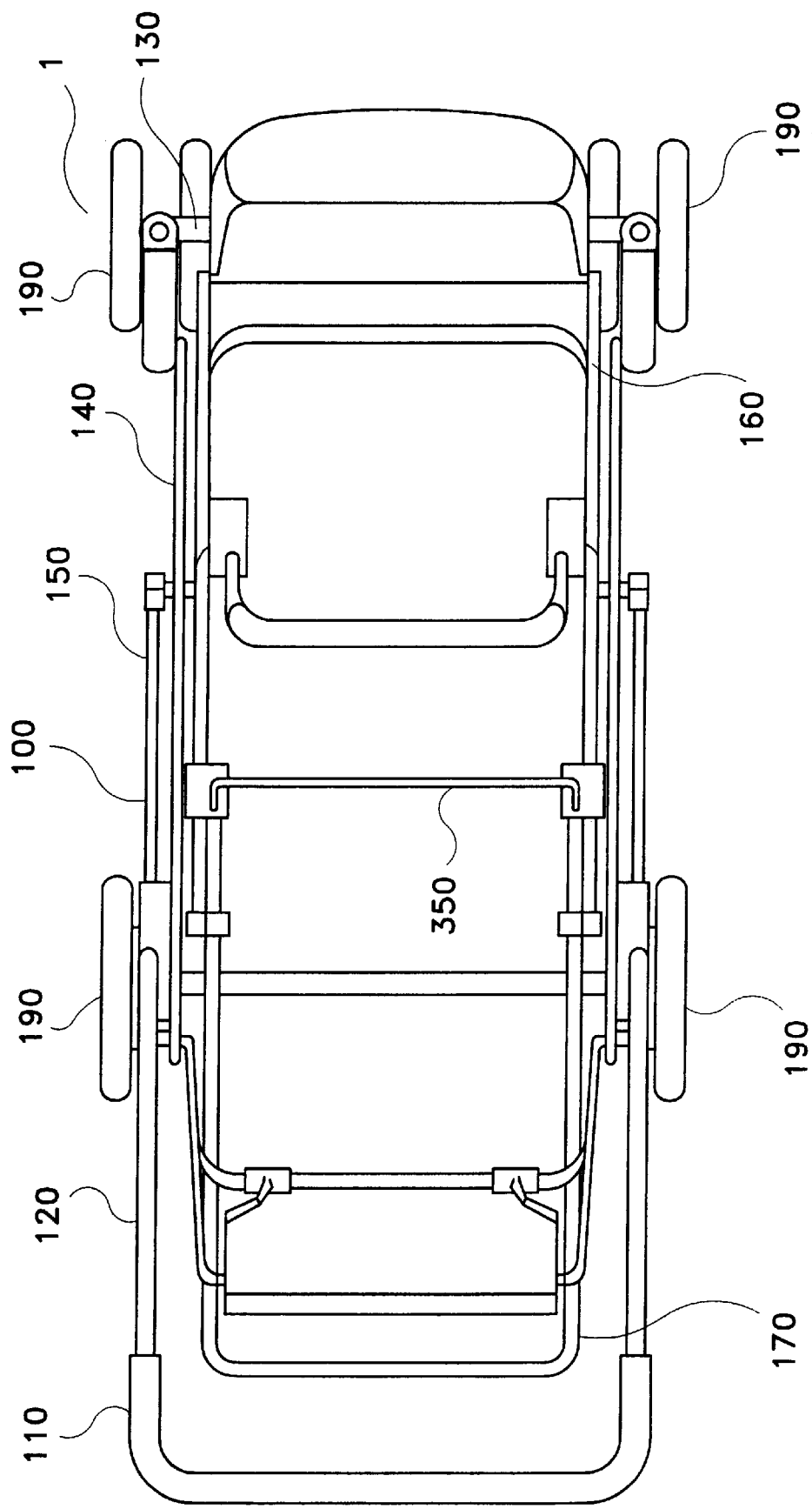
FIG. 1 is a top plan view of a collapsible stroller frame according to a preferred embodiment of the present invention in the open position.

In accordance with the objects of the present invention, the collapsible stroller of the present invention includes a frame having a front and rear, a basket member extending toward the rear of the frame, and a basket connector fixedly connected to the basket member and slidably connected to the frame. For example, FIG. 1 shows a top plan view of the frame of the collapsible stroller 1 in accordance with the present invention. FIG. 1 shows only the skeleton of a collapsible stroller according to the present invention. In other words, a preferred commercial embodiment of a collapsible stroller according to the present invention includes a fabric covering over the skeleton of the stroller. For example, such a fabric covering is shown in U.S. Pat. No. 5,741,021, which is hereby incorporated by reference.

Collapsible stroller 1 includes a frame 100 and wheels 190. The frame of a collapsible stroller according to the present invention comprises a top tube, a bottom tube, a handle tube, and a front wheel tube pivotally connected to one another, wherein the basket connector is slidably connected to the bottom tube of the frame. For example, referring to FIGS. 1 and 6, frame 100 includes handle 110, handle tube 120, front wheel tube 130, top tube 140, rear wheel tube 150, bottom tube 160, substantially U-shaped basket tube 170, and seat support rod 350. Of course, it should be understood that frame 100 could comprise any appropriate configuration provided that the elements collapse to a relatively smaller configuration. Also, although basket tube 170 is shown as being substantially U-shaped, it should be understood that this element could be formed in any appropriate configuration provided that a slidable connection between the basket and the frame can be maintained. Frame 100 and its various components may be constructed of any appropriate rigid material. For example, frame 100 may be constructed of metal or a high-strength plastic. Preferably, frame 100 may be constructed of metal tubing or an injection molded plastic.

Figure 6:
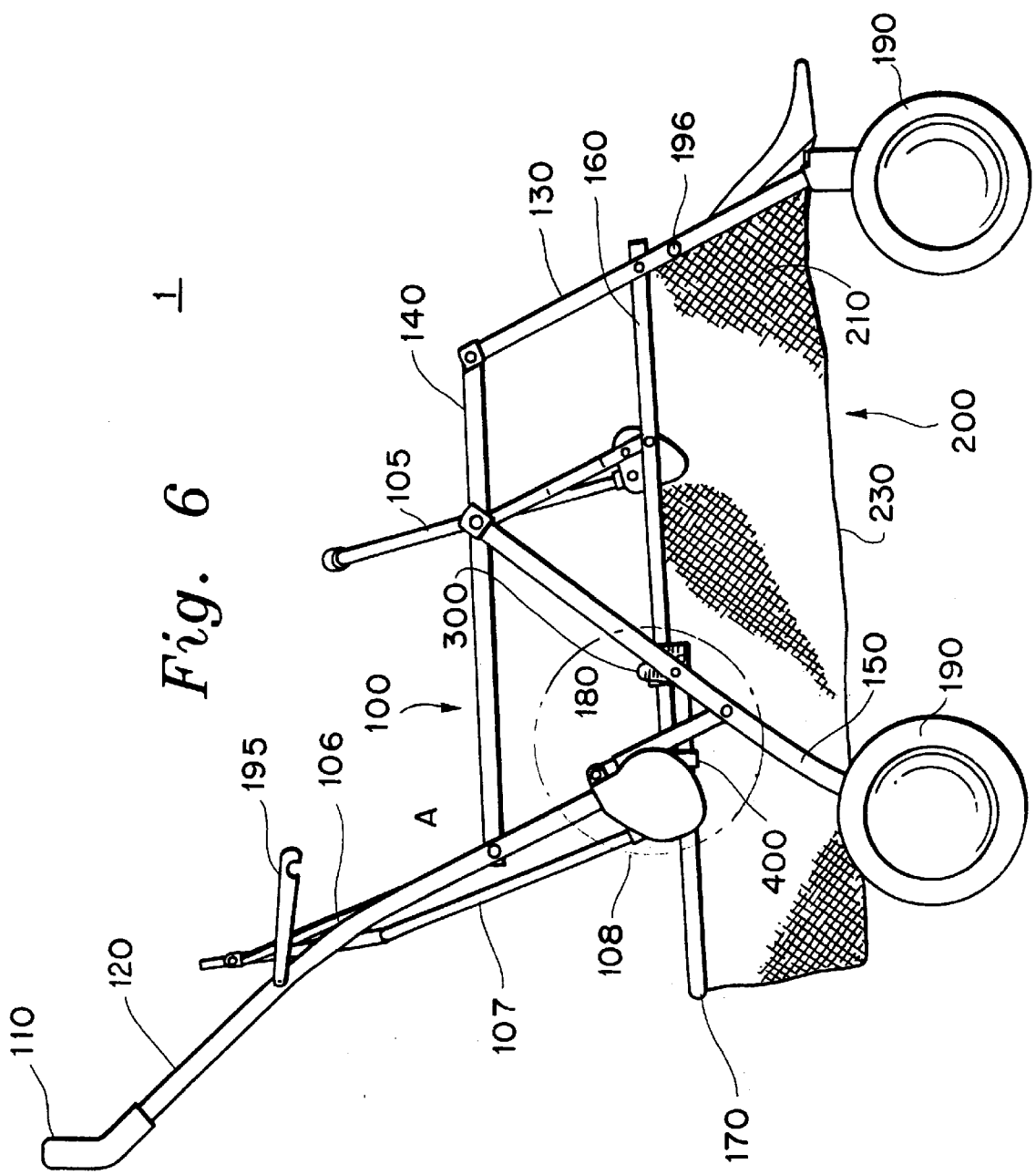
FIG. 6 shows a side view of a stroller frame in accordance with the present invention in the fully opened (deployed) position.

Frame 100 is shown in greater detail in FIG. 6. FIG. 6 is a side view of the collapsible stroller frame in accordance with the present invention shown in the fully opened, deployed position. In a preferred embodiment, the stroller in accordance with the present invention is adapted to carry two children (in a one child behind the other configuration). Frame 100 further includes front seat back 105, rear seat back 106, rear seat adjustment assembly 107, rear seat adjustment assembly pivot 108, locking bar 195, and lock pin 196. Handle tube 120 is pivotally connected to top tube 140 and bottom tube 160. Rear seat adjustment assembly 107 is pivotally connected to handle tube 120 via rear seat adjustment assembly pivot 108. Front wheel tube 130 is pivotally connected to top tube 140 and bottom tube 160. Rear wheel tube 150 is pivotally connected to top tube 140 and to side fold link 180, while side fold link 180 is pivotally connected to handle tube 120. Rear wheel tube 150 is also slidably and pivotally connected to basket connector 300. Bottom tube 160 is slidably connected to basket tube 170 via basket connector 300 and basket guide 400.

The preferred collapsible stroller according to the present invention comprises a flexible basket connected to the basket 200 tube 170 and to the frame wherein the flexible basket 200 includes a plurality of flexible side panels and a rigid bottom panel to facilitate collapsing when the stroller is folded. For example, FIG. 6 also shows slidable extending basket 200 according to the present invention. Slidable extending basket 200 preferably includes flexible side panels 210 and 220, and rigid bottom panel 230. Slidable extending basket 200 (with the exception of rigid bottom panel 230) is preferably constructed of any flexible material. For example, slidable extending basket 200 may be constructed of a mesh material. Of course, it should be understood that slidable extending basket 200 could comprise any appropriate configuration to facilitate storage of items. The sliding function of extending basket 200 is accomplished via side fold link 180, basket connector 300, and basket guide 400, all of which are described in detail below.

The preferred basket connector of a collapsible stroller according to the present invention comprises a first orifice for receiving the basket tube 170 and a second orifice for receiving the bottom tube in a slidable connection. For example, basket connector 300 according to the present invention is shown in greater detail in FIGS. 2 and 3A–F. Basket connector 300 includes upper bore 304, lower bore 308, slot 312, transverse bore 314, and elongated recess portion 316. Basket connector 300 may be constructed of any appropriate rigid material, preferably a high-strength plastic, and most preferably an injection-molded plastic. Although the bores in basket connector 300 are shown as circular, it should be understood that they are adapted to cooperate with the various frame and basket elements and could comprise any geometry which facilitates the basket member in sliding toward the front of the frame during folding.

FIG. 3A is a cross-sectional view taken along line 3A—3A of FIG. 2, while FIG. 3B is a cross-sectional view taken along line 3B—3B of FIG. 2. As can be readily seen in FIGS. 3A and 3B, lower bore 308 is closed at one end 310. Lower bore 308 is adapted to received the end of U-shaped basket tube 170. One end of U-shaped basket tube 170 is placed in lower bore 308 until the end of the basket tube 170 abuts lower bore closed end 310. Then a pin or rod (not shown) passes through transverse bore 314 and through a corresponding bore in the U-shaped basket tube 170 to retain the basket tube 170 in lower bore 308. Upper bore 304 is adapted to slidably receive bottom tube 160, while the slot 312 in the upper bore 304 is adapted to slidably receive seat support rod 350.

Figure 3C:
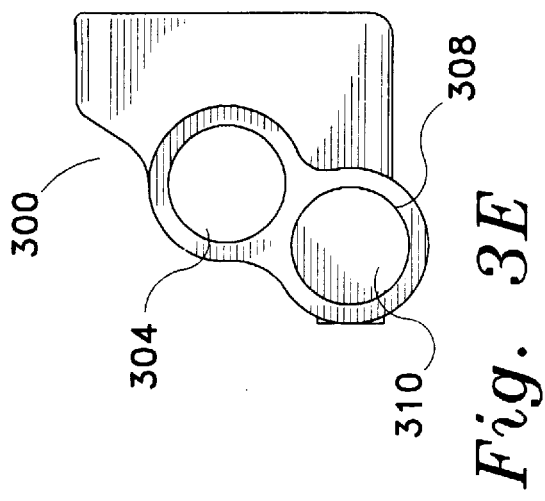
FIG. 3C is a side view of a preferred basket connecter in accordance with the present invention from a point of view within the frame of the stroller.
Figure 3E:
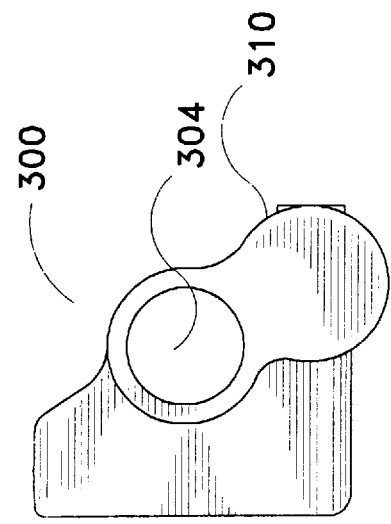
FIG. 3E is an end view of a preferred basket connecter in accordance with the present invention from a point of view at the rear of the stroller.
Figure 3D:
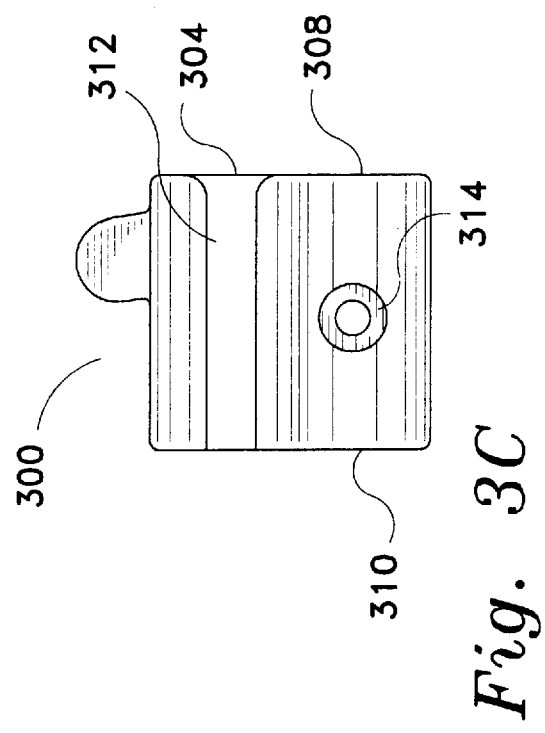
FIG. 3D is a side view of a preferred basket connecter in accordance with the present invention from a point of view outside the frame of the stroller.
Figure 3F:
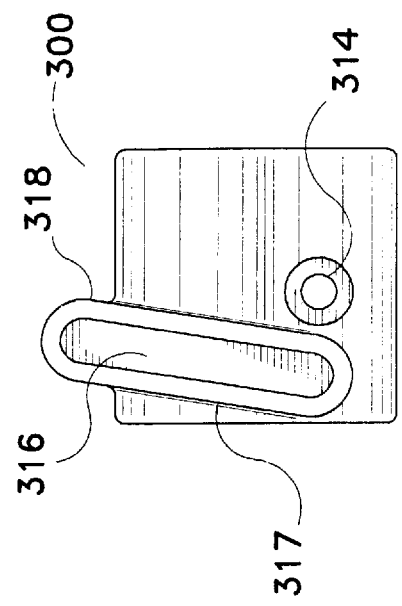
FIG. 3F is an end view of a preferred basket connecter in accordance with the present invention from a point of view at the front of the stroller.

The elongated recess portion 316 of basket connector 300 is shown in greatest detail in FIG. 3D. The raised outer sides 317 and 318 of elongated recess portion 316 are slidably received by the sides 322 and 324 of basket connector slide member 320 (see FIG. 8A). The preferred basket connector of a collapsible stroller according to the present invention further comprises an oblong orifice for slidably and pivotally accepting a pin received from the rear wheel tube. For example, sides 322 and 324 define an oblong orifice hereinafter referred to as basket connector slide member 320. A pin or rod 326 (see FIG. 6A) passes through rear wheel tube 150 and basket connector slide member 320 and is received within elongated recess portion 316. Thus, basket connector slide member 320 is pivotally connected to rear wheel tube 150. FIGS. 3C–3F illustrate the orientation of basket connector 300 with respect to a collapsible stroller in accordance with the present invention. FIG. 3C shows the basket connector 300 from a point of view within the frame of the stroller. FIG. 3D shows the basket connector 300 from a point of view outside the frame of the stroller. FIG. 3E shows the basket connector 300 from a point of view at the rear of the stroller, while FIG. 3F shows the basket connector 300 from a point of view at the front of the stroller.

The preferred collapsible stroller according to the present invention further comprises a basket guide fixedly connected to the frame, and slidably connected to the basket member for guiding the basket member through a range of motion relative to the frame. For example, preferred basket guide 400 according to the present invention is shown in detail in FIGS. 4 and 5A–D. Basket guide 400 includes upper bore 420, lower bore 410, and transverse bore 430. Basket guide 400 may be constructed of any appropriate rigid material, preferably a high-strength plastic, and more preferably an injection-molded plastic. It should be understood that basket guide 400 could comprise constructed in any geometry which facilitates the basket member in sliding toward the front of the frame during folding.

Upper bore 420 is adapted to received the end of bottom tube 160. One end of bottom tube 160 is placed in upper bore 420 until the end of the bottom tube 160 is coincident with the end of the upper bore 420. Then a pin or rod (not shown) from rear seat adjustment assembly pivot 108 passes through transverse bore 430 and through a corresponding bore in the bottom tube 160 to retain the bottom tube 160 in upper bore 420. Lower bore 410 is adapted to slidably receive basket tube 170.

FIGS. 5A–5C illustrate the orientation of basket guide 400 with respect to a collapsible stroller in accordance with the present invention. FIG. 5A shows the basket guide 400 from a point of view outside the frame of the stroller. FIG. 5B shows the basket guide 400 from a point of view at the rear of the stroller. FIG. 5C shows the basket guide 400 from a point of view within the frame of the stroller, while FIG. 5D is a cross-sectional view of the basket guide 400 taken along line D—D in FIG. 5C. FIG. 5D shows that the entrance 432 of transverse bore 430 is larger on the side which faces the rear seat adjustment assembly pivot 108.

The sliding function of extending basket 200 will now be described in detail with reference to FIGS. 6–9A. These figures generally show the cooperation and various positions of the several preferred elements of the present invention as the preferred stroller frame progresses from a fully open, deployed position to a fully closed, folded position.

Figure 6A:
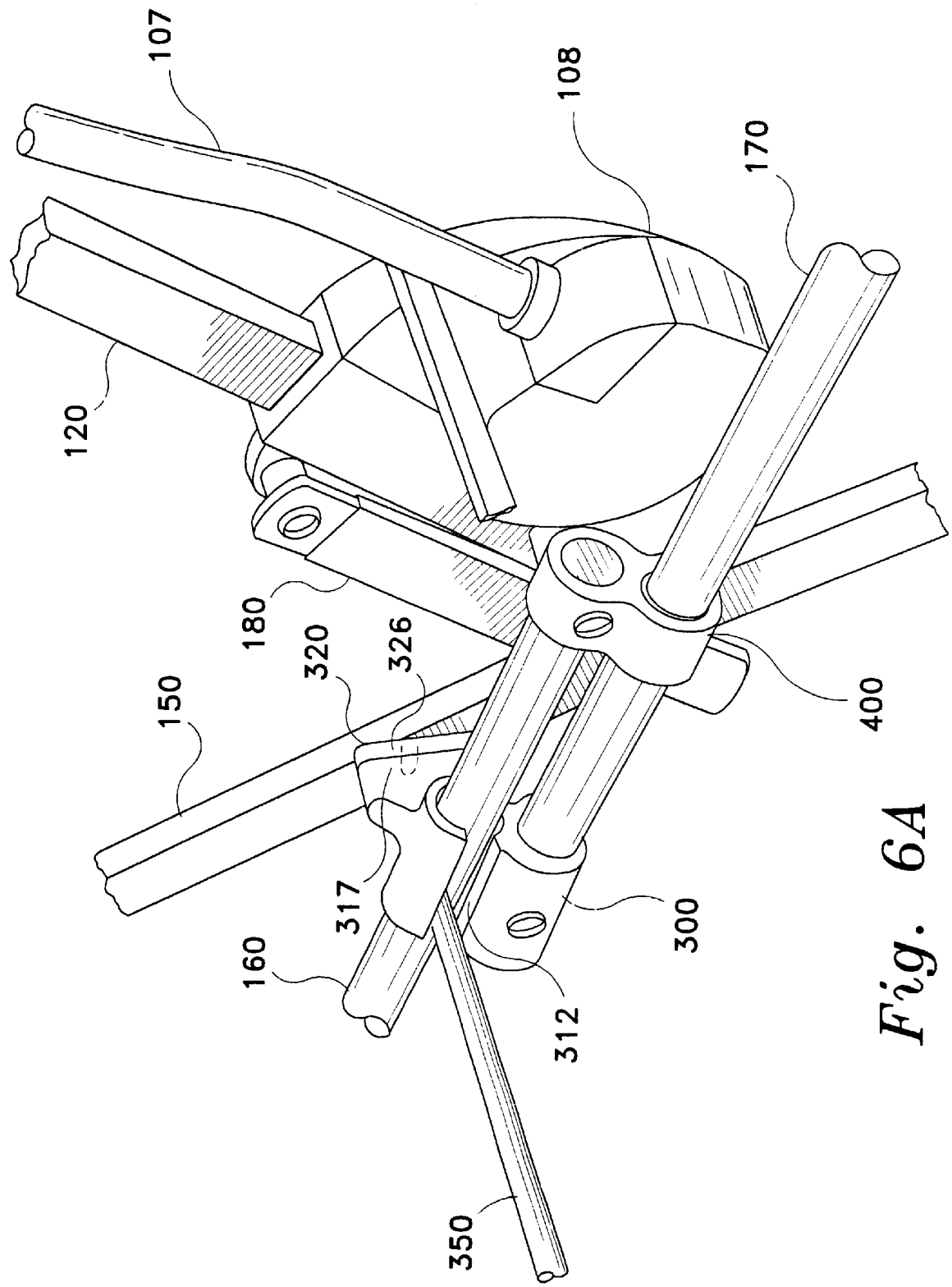
FIG. 6A is an enlarged inboard isometric view of circular section A of the stroller frame of FIG. 6.

FIG. 6 shows a preferred frame of a collapsible stroller in accordance with the present invention in the open (unfolded) position. FIG. 6A is an enlarged view of the circular section A in FIG. 6 shown from a point of view within the frame of the stroller.

FIG. 6A shows that bottom tube 160 and seat support rod 350 are slidably received in basket connector 300. In the fully-opened position, seat support rod 350 is located in close proximity to the end of slot 312. Also, the raised outer sides 317 and 318 of elongated recess portion 316 of the basket connector 300 are fully received in the closed end of basket connector slide member 320. FIG. 6A also shows that one end of U-shaped basket tube 170 is captured in the lower bore of basket connector 300. Furthermore, an end of bottom tube 160 is captured in the upper bore of basket guide 400, while U-shaped basket tube 170 is slidably received in the lower bore of basket guide 400. Also, in the fully-opened position the side fold link 180 remains substantially parallel to the handle tube 120.

Figure 7:
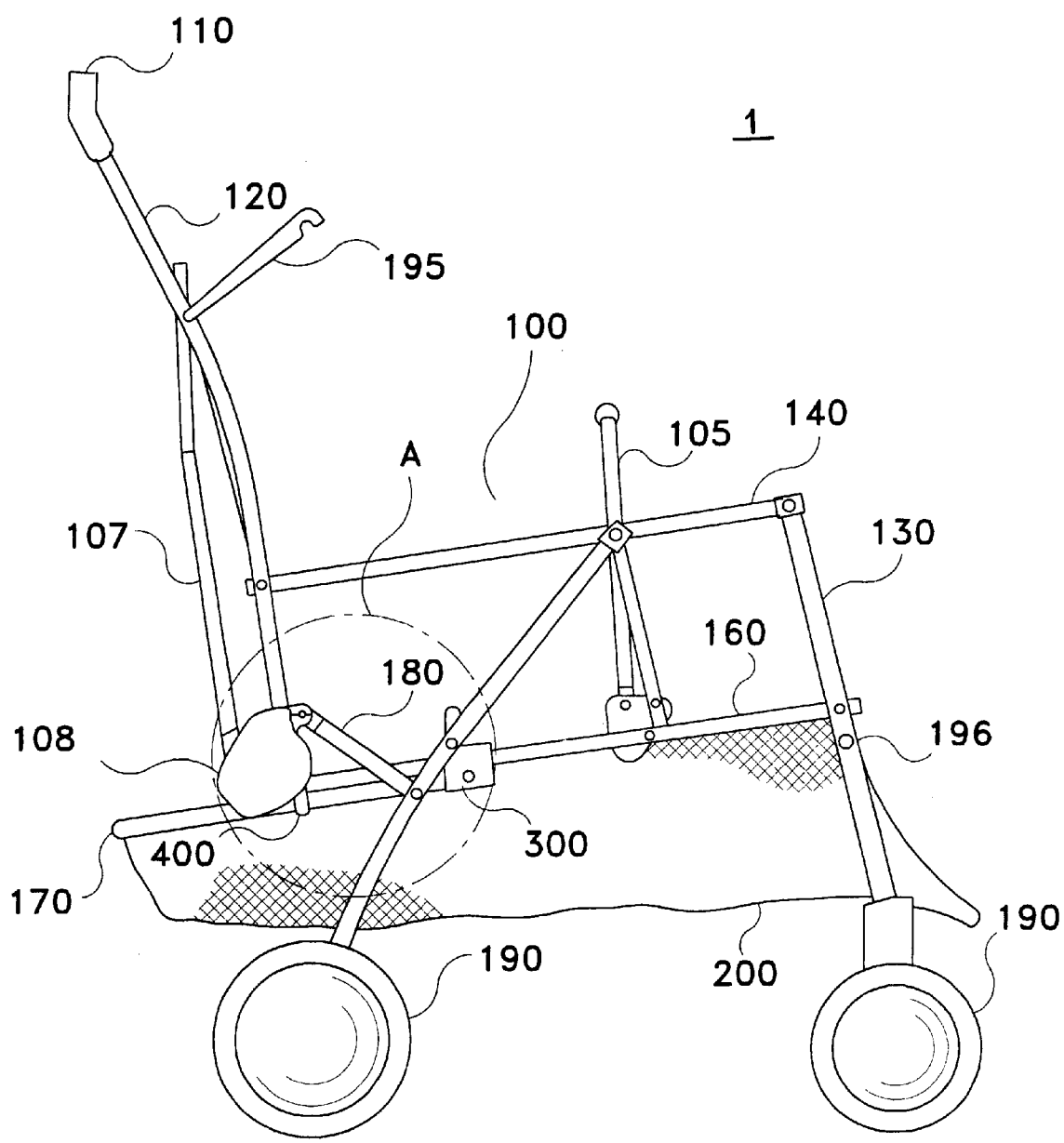
FIG. 7 shows a side view of a stroller frame in accordance with the present invention in about a one-third folded configuration.
Figure 7A:
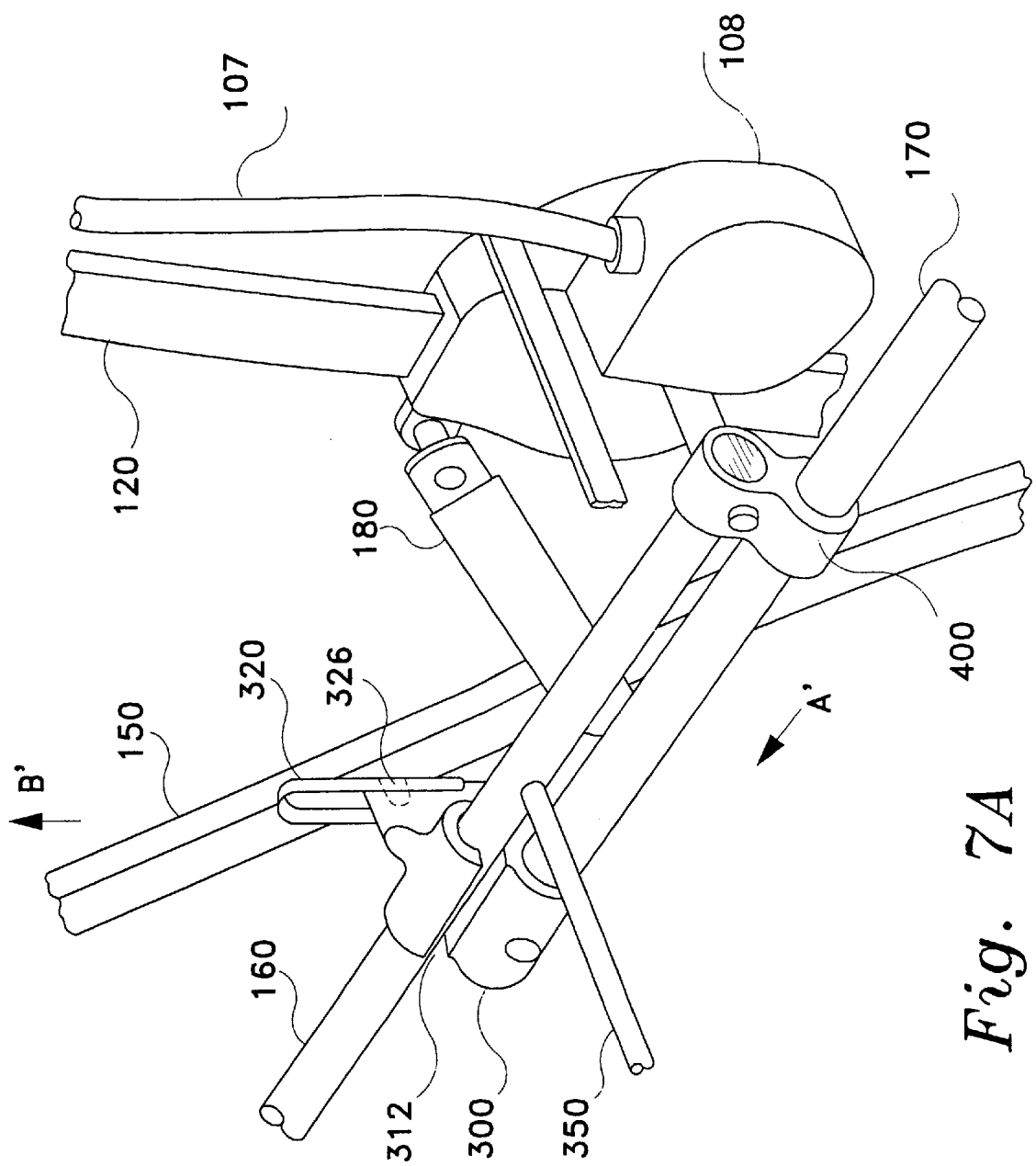
FIG. 7A is an enlarged inboard isometric view of circular section A of the stroller frame of FIG. 7.

To fold the stroller, a locking mechanism (not shown) which fixedly connects the handle tube 120 to the rear wheel tube 150 is released and the handle 110 is pushed towards the front of the stroller. FIG. 7 shows a side view of a stroller frame in accordance with the present invention in about a one-third folded configuration. As the handle 110 is pushed towards the front of the stroller, side fold link 180 pushes the end of the rear wheel tube 150 that is pivotally connected to the top tube 140 towards the front of the stroller. Thus, front seat back 105 rotates clockwise, as does front wheel tube 130. Furthermore, during the folding operation, top tube 140 moves toward the front of the stroller, while bottom tube 160 moves toward the rear of the stroller. FIG. 7A is an enlarged view of the circular section A in FIG. 7 shown from a point of view within the frame of the stroller.

As shown in FIG. 7A, as handle 110 is pushed towards the front of the stroller, side fold link 180 causes basket connector slide member 320 to be axially displaced from basket connector 300 along a direction labeled B'. Also, Furthermore, FIG. 7A shows that during folding, the basket connector 300 slides along bottom tube 160, disengaging seat support rod 350 from slot 312, while basket tube 170 slides through the bottom bore of basket guide 400, along a direction labeled A'. This movement of basket tube 170 along the direction A' is caused by a pin or rod 326 which passes through rear wheel tube 150 and basket connector slide member 320 and is received within elongated recess portion 316. This pin or rod 326 contacts raised outer sides 317 and 318 of elongated recess portion 316 and causes movement of basket connector 300 and correspondingly, basket tube 170. Thus, U-shaped basket tube 170 moves toward the front of the stroller and the length of basket 200 extending beyond rear seat adjustment assembly pivot 108 is shortened.

Figure 8:
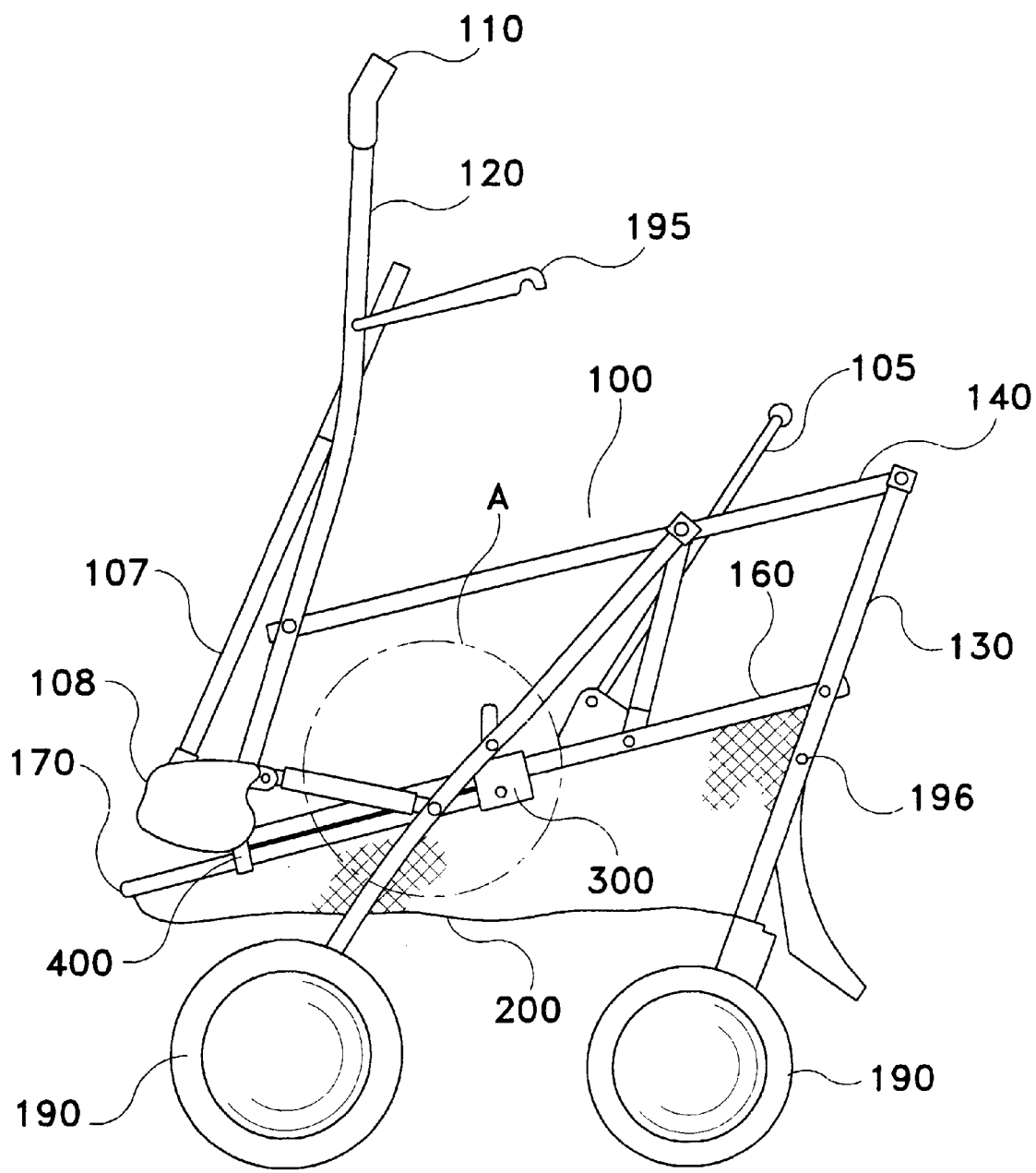
FIG. 8 shows a side view of a stroller frame in accordance with the present invention in about an two-thirds folded configuration.
Figure 8A:
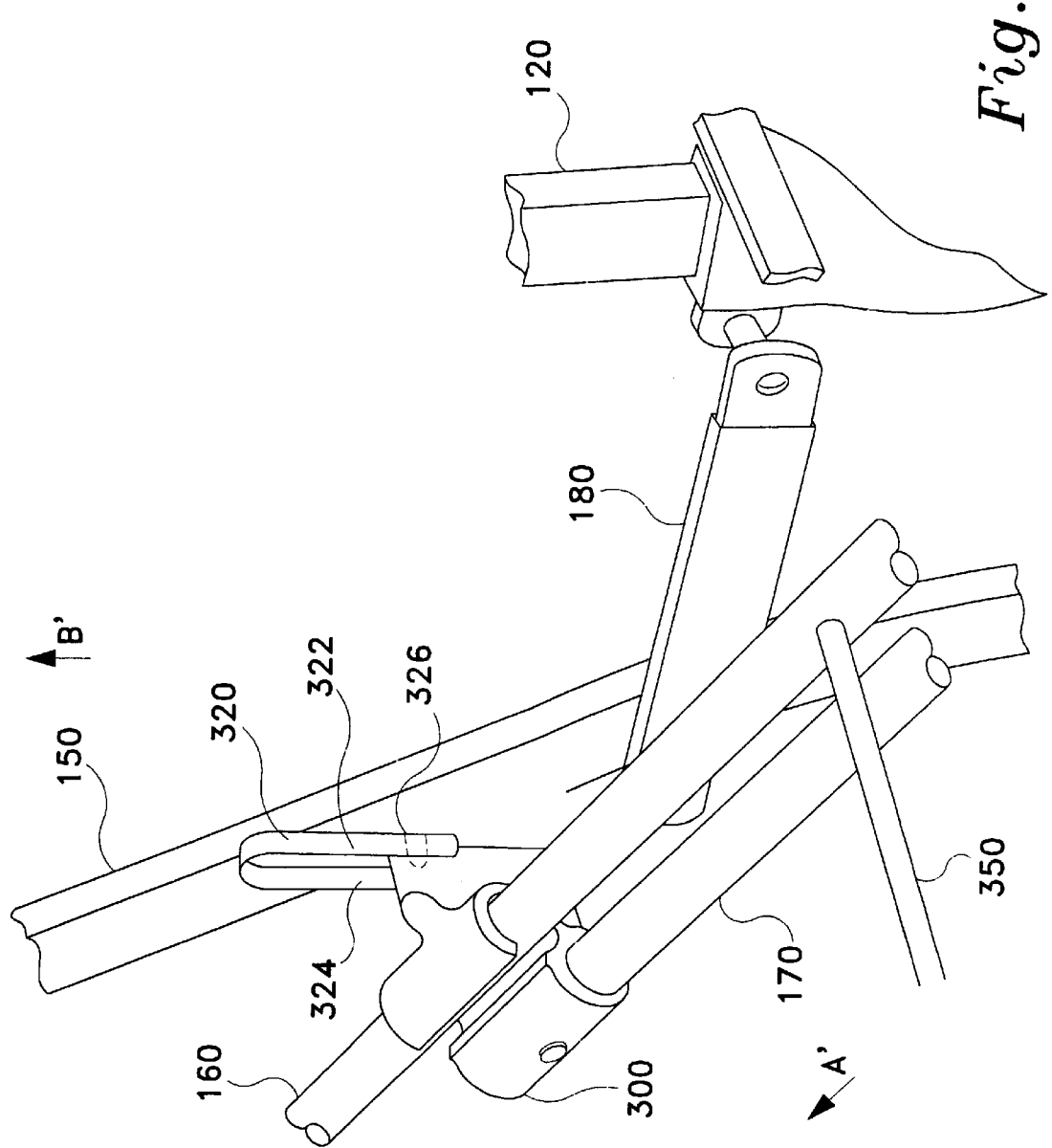
FIG. 8A is an enlarged inboard isometric view of circular section A of the stroller frame of FIG. 8.

FIG. 8 shows a side view of the stroller frame in about a two-thirds folded configuration. As the handle 110 is pushed further towards the front of the stroller, side fold link 180 becomes perpendicular to handle tube 120. Also, as can be seen in FIG. 8, front seat back 105 and front wheel tube 130 continue to be rotated clockwise. Also, top tube 140 continues to move toward the front of the stroller while bottom tube 160 continues to move toward the rear of the stroller. Furthermore, basket tube 170 continues to slide along bottom tube 160 toward the front of the stroller. FIG. 8A is an enlarged view of the circular section A in FIG. 8 shown from a point of view within the frame of the stroller.

As shown in FIG. 8A, as handle 110 is pushed further towards the front of the stroller, side fold link 180 causes basket connector slide member 320 to be further axially displaced from basket connector 300 along a direction labeled B', while basket connector 300 is further slidably displaced from seat support rod 350 along a direction labeled A'. Thus, U-shaped basket tube 170 continues to move towards the front of the stroller and the length of basket 200 extending beyond rear seat adjustment assembly pivot 108 is further shortened.

Figure 9A:
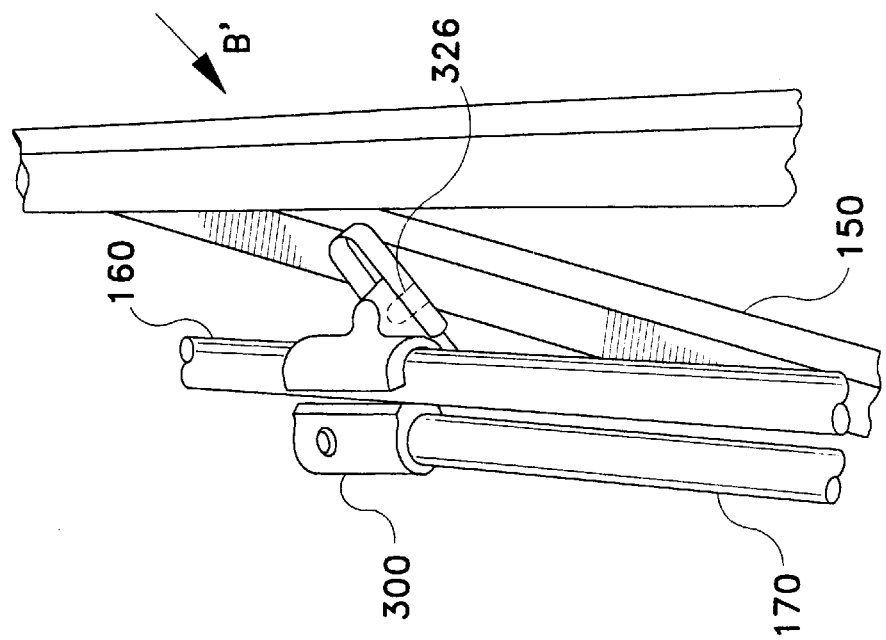
FIG. 9A is an enlarged inboard isometric view of circular section A of the stroller frame of FIG. 9.
Figure 9:
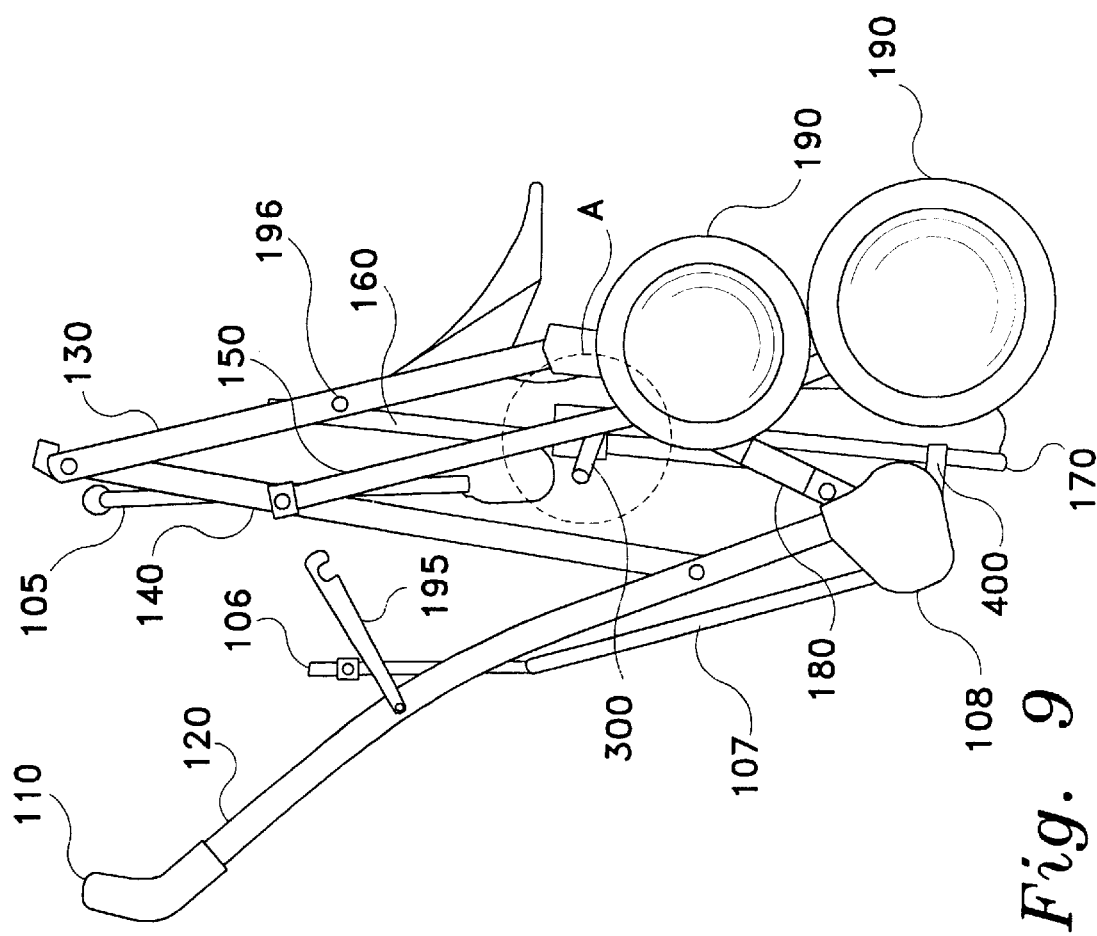
FIG. 9 shows a side view of a stroller frame in accordance with the present invention in about an nearly folded configuration.

FIG. 9 shows a side view of a stroller frame in accordance with the present invention in about a nearly folded configuration. When the stroller of the present invention is fully folded, lock pin 196 may be engaged by lock bar 195 to keep the stroller from becoming unfolded. FIG. 9A is an enlarged view of the circular section A in FIG. 9 shown from a point of view within the frame of the stroller.

FIG. 9A shows that as the stroller nears the fully-folded position, the angle between rear wheel tube 150 and bottom tube 160 becomes smaller. At a certain point in the folding of the stroller of the present invention, the closed end of basket connector slide member 320 actually moves towards basket connector 300 along a direction labeled B'. Thus when fully folded, the U-shaped portion of the basket tube 170 is closer to the front of the stroller than the rearmost point on the rear wheels 190.

The present invention provides a collapsible stroller which includes an extending basket in the fully opened position which retracts during the folding operation underneath the frame of the stroller. Thus, the present invention provides a collapsible stroller with an easily accessible and relatively large basket which collapses into a relatively small space. In other words, in the fully opened position, the basket extends to the rear of the stroller to allow easy access, and a relatively large storage space, while during folding, the basket is retracted toward the front of the stroller to minimize storage space.

It will be apparent to those skilled in the art that various modifications and variations can be made in the collapsible stroller with slidable basket of the present invention without departing from the spirit or scope of the invention. Thus, it is intended that the present invention cover the modifications and variations of this invention provided they come within the scope of the appended claims and their equivalents.

What is claimed is:

1. A collapsible stroller comprising:
    a foldable frame having a bottom tube and a front wheel tube, and a rear wheel tube, the front wheel tube being pivotally connected to the bottom tube;
    a basket tube extending rearwardly from the bottom tube, the basket tube being adapted to hold at least a part of a flexible basket, and being movable between an extended position and a retracted position extending alongside the bottom tube;
    a basket connector slidably and pivotally connected to the rear wheel tube, the basket connector having a first portion fixedly connected to one of the bottom tube and the basket tube, and a second portion slidably connected to the other of the bottom tube and the basket tube; and
    a basket guide fixedly connected to one of the basket tube and the bottom tube and slidably connected to the other of the basket tube and the bottom tube,
    wherein the basket connector allows the basket tube to slide relative to the bottom tube during folding of the stroller to move the basket tube to the retracted position.

2. The collapsible stroller of claim 1, wherein the frame further comprises a top tube pivotally connected to the front wheel tube and the rear wheel tube, and a handle tube pivotally connected to the top tube and the rear wheel tube.

3. The collapsible stroller of claim 2, further comprising a side fold link pivotally connected to the handle tube and pivotally connected to the rear wheel tube.

4. The collapsible stroller of claim 1, wherein the basket tube is substantially U-shaped.

5. The collapsible stroller of claim 1, wherein the basket connector comprises a first orifice for receiving the basket tube and a second orifice for receiving the bottom tube in a slidable connection.

6. The collapsible stroller of claim 5, wherein the basket connector further comprises an oblong orifice on the rear wheel tube and a pin extending from the basket connector, the pin slidably and pivotally received in the oblong orifice.

7. The collapsible stroller of claim 5, wherein the basket connector further comprises an oblong orifice on the rear wheel tube and a pin extending from the basket connector, the pin slidably and pivotally received in the oblong orifice.

8. The collapsible stroller of claim 1, wherein the basket guide is fixedly connected to a rearward portion of the bottom tube and slidably connected to the basket tube, and wherein the first portion of the basket connector is fixedly connected to a forward portion of the basket tube and the second portion of the basket connector is slidably connected to the bottom tube.

9. The collapsible stroller of claim 1, further including the flexible basket connected to the basket tube and to the bottom tube.

10. The collapsible stroller of claim 9, wherein the flexible basket includes a plurality of flexible side panels and a rigid bottom panel to facilitate collapsing when the stroller is folded.

11. A collapsible stroller comprising:
    a foldable frame having a bottom tube, a front wheel tube, and a rear wheel tube, the front wheel tube being pivotally connected to the bottom tube, and the bottom tube being slidably and pivotally connected to the rear wheel tube;
    a basket tube extending rearwardly from the bottom tube and slidably connected to a rearward portion of the bottom tube, the basket tube being movable between an extended position and a retracted position extending alongside the bottom tube, the basket tube having a forward portion pivotally and slidably connected to the rear wheel tube, the bottom tube being slidably connected to the forward portion of the basket tube; and
    a flexible basket suspended from both the basket tube and the bottom tube, wherein during folding of the frame, the basket tube slides toward the front wheel tube and moves the basket tube to the retraced position.

12. The collapsible stroller of claim 11, wherein the frame further comprises a top tube pivotally connected to the front wheel tube and the rear wheel tube, a handle tube pivotally connected to the top tube and the rear wheel tube, and a basket connector fixedly connected to the basket tube and slidably connected to the bottom tube.

13. The collapsible stroller of claim 12, wherein the rear wheel tube is pivotally and slidably connected to the basket connector.

14. The collapsible stroller of claim 13, further comprising a side fold link pivotally connected to the handle tube and pivotally connected to the rear wheel tube.

15. The collapsible stroller of claim 12, wherein the basket connector comprises a first orifice for receiving the basket tube and a second orifice for receiving the bottom tube in a slidable connection.

16. The collapsible stroller of claim 11, wherein the basket tube is substantially U-shaped.

17. The collapsible stroller of claim 11, further comprising a basket guide fixedly connected to the bottom tube, and slidably connected to the basket tube for guiding the basket tube through a range of motion relative to the rear wheel tube.

18. The collapsible stroller of claim 11, wherein the flexible basket includes a plurality of side panels and a rigid bottom panel to facilitate collapsing when the stroller is folded.

* * * * *